US012704202B2

(12) United States Patent
Boldt et al.

(10) Patent No.: US 12,704,202 B2
(45) Date of Patent: Aug. 11, 2026

(54) PIPE FITTING STAND

(71) Applicant: MILWAUKEE ELECTRIC TOOL CORPORATION, Brookfield, WI (US)

(72) Inventors: Benjamin J. Boldt, Milwaukee, WI (US); Manas Mahaddalkar, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 296 days.

(21) Appl. No.: 18/467,312

(22) Filed: Sep. 14, 2023

(65) Prior Publication Data

US 2024/0084927 A1 Mar. 14, 2024

Related U.S. Application Data

(60) Provisional application No. 63/406,493, filed on Sep. 14, 2022.

(51) Int. Cl.
*F16L 3/02* (2006.01)

(52) U.S. Cl.
CPC .................................... *F16L 3/02* (2013.01)

(58) Field of Classification Search
CPC ........ F16M 11/245; F16M 11/38; B25H 1/04; B25H 1/0035; B25H 1/0042; B25H 1/0021
See application file for complete search history.

(56) References Cited

U.S. PATENT DOCUMENTS 3,741,509 A * 6/1973 Kelly .................. F16M 11/046 248/161
6,450,464 B1 * 9/2002 Thomas ............... F16M 11/046 248/431
10,775,207 B2 * 9/2020 Becker ................ F16M 11/046

* cited by examiner

*Primary Examiner* — Jason L Vaughan
*Assistant Examiner* — Amanda Kreiling
(74) *Attorney, Agent, or Firm* — Michael Best & Friedrich LLP

(57) ABSTRACT

A pipe fitting stand includes a central support post, a fixed support structure disposed on the central support post, a sliding support structure disposed on the central support post, a telescoping post extending at least partially into the central support post, a cradle engaged with the telescoping post that is configured to support a portion of a pipe, at least three legs extending from the fixed support structure, and a leg support extending between each of the at least three legs and the sliding support structure, wherein as the sliding support structure is moved along the central support post in a first direction, the at least three legs are drawn inward to a folded state and as the sliding support structure is moved in a second direction the at least three legs splay outward to a deployed state.

20 Claims, 9 Drawing Sheets

PIPE FITTING STAND

CROSS-REFERENCE TO RELATED APPLICATIONS

This application claims priority to U.S. Provisional Patent Application No. 63/406,493 filed on Sep. 14, 2022, the entire content of which is incorporated herein by reference.

FIELD OF THE DISCLOSURE

The present disclosure relates to workpiece supporting stands, and more particularly to pipe fitting stands.

BACKGROUND OF THE DISCLOSURE

Pipe fitting stands are generally used to support a pipe during various operations such as threading, cutting, welding, etc. Pipe fitting stands typically include a table providing an upwardly directed work surface and legs connected to the table.

SUMMARY OF THE DISCLOSURE

The present disclosure provides, in one aspect, a pipe fitting stand that includes a central support post, a fixed support structure disposed on the central support post, a sliding support structure disposed on the central support post, a telescoping post extending at least partially into the central support post, a cradle engaged with the telescoping post that is configured to support a portion of a pipe, at least three legs extending from the fixed support structure, and a leg support extending between each of the at least three legs and the sliding support structure, wherein as the sliding support structure is moved along the central support post in a first direction, the at least three legs are drawn inward to a folded state and as the sliding support structure is moved in a second direction the at least three legs splay outward to a deployed state.

The present disclosure provides, in another aspect, a pipe fitting stand that includes a central support post, a fixed support structure disposed on the central support post, the fixed support structure including a fixed upper handle, a sliding support structure slidably disposed on the central support post, the sliding support structure including a moving lower handle, a telescoping post slidably disposed within the central support post, a cradle engaged with the telescoping post that is configured to support a portion of a pipe, at least three legs extending from the fixed support structure, and a leg support extending between each of the at least three legs and the sliding support structure, wherein as the sliding lower handle is moved along the central support post toward the fixed upper handle, the at least three legs are drawn inward to a folded state and as the sliding lower handle is moved away from the fixed upper handle, the at least three legs splay outward to a deployed state.

The present disclosure provides, in yet another aspect, a pipe fitting stand that includes a central support post having an upper end and a lower end, a fixed support structure disposed on the upper end of the central support post, a sliding support structure disposed on the central support post, wherein the sliding support structure slides between the lower end of the central support post and the fixed support structure, a telescoping post extending at least partially into the central support post, the telescoping post slidably disposed within the central support post and including an upper end, an extension post extending at least partially into the telescoping post, an cradle disposed on the extension post that is configured to support a portion of a pipe, at least three legs extending from the fixed support structure, and a leg support extending between each of the at least three legs and the sliding support structure, wherein as the sliding support structure moves along the central support post toward the fixed support structure, the at least three legs are drawn inward to a fold folded state and as the sliding support structure is moved away from the fixed support structure the at least three legs splay outward to a deployed state.

Figure 1:
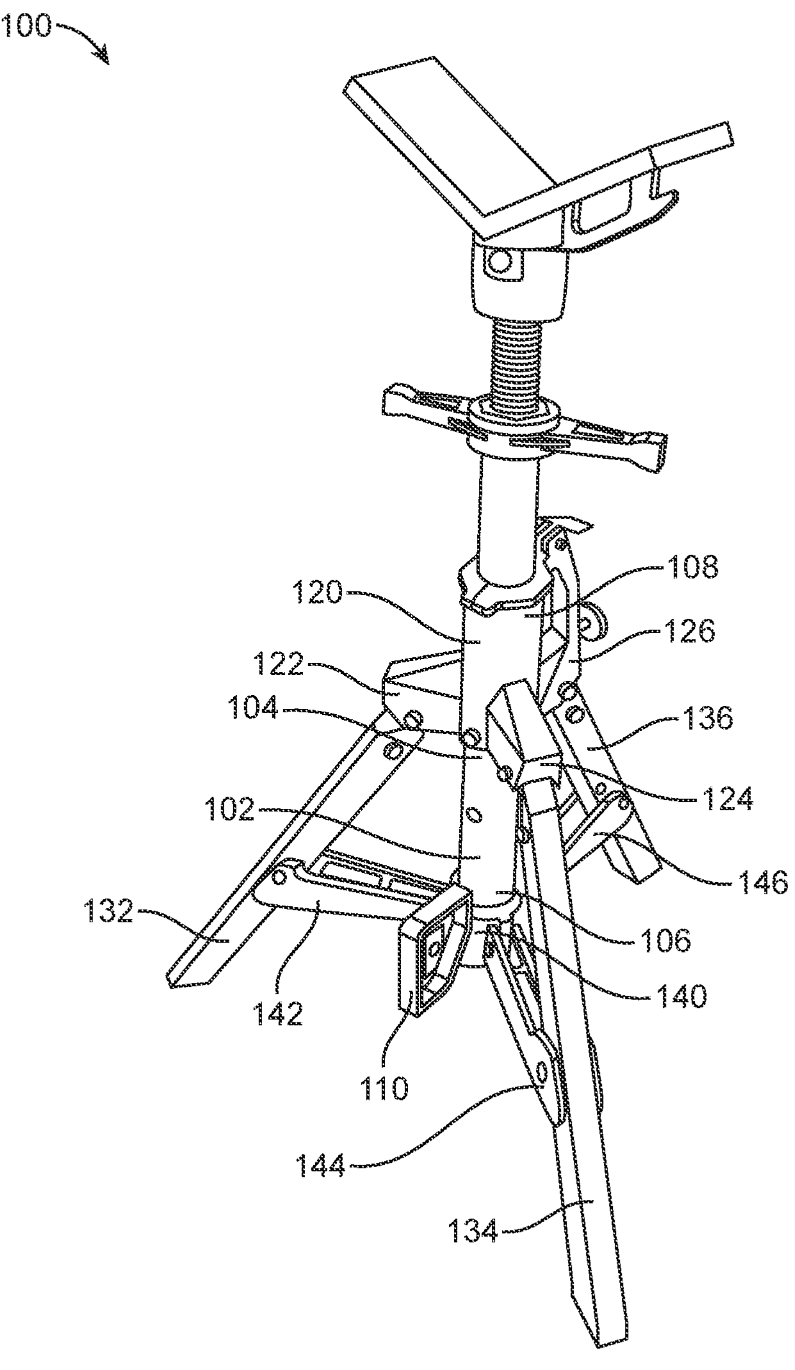
FIG. 1 a first side perspective view of a pipe fitting stand in a deployed state according to an embodiment of the disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

DETAILED DESCRIPTION

Figure 2:
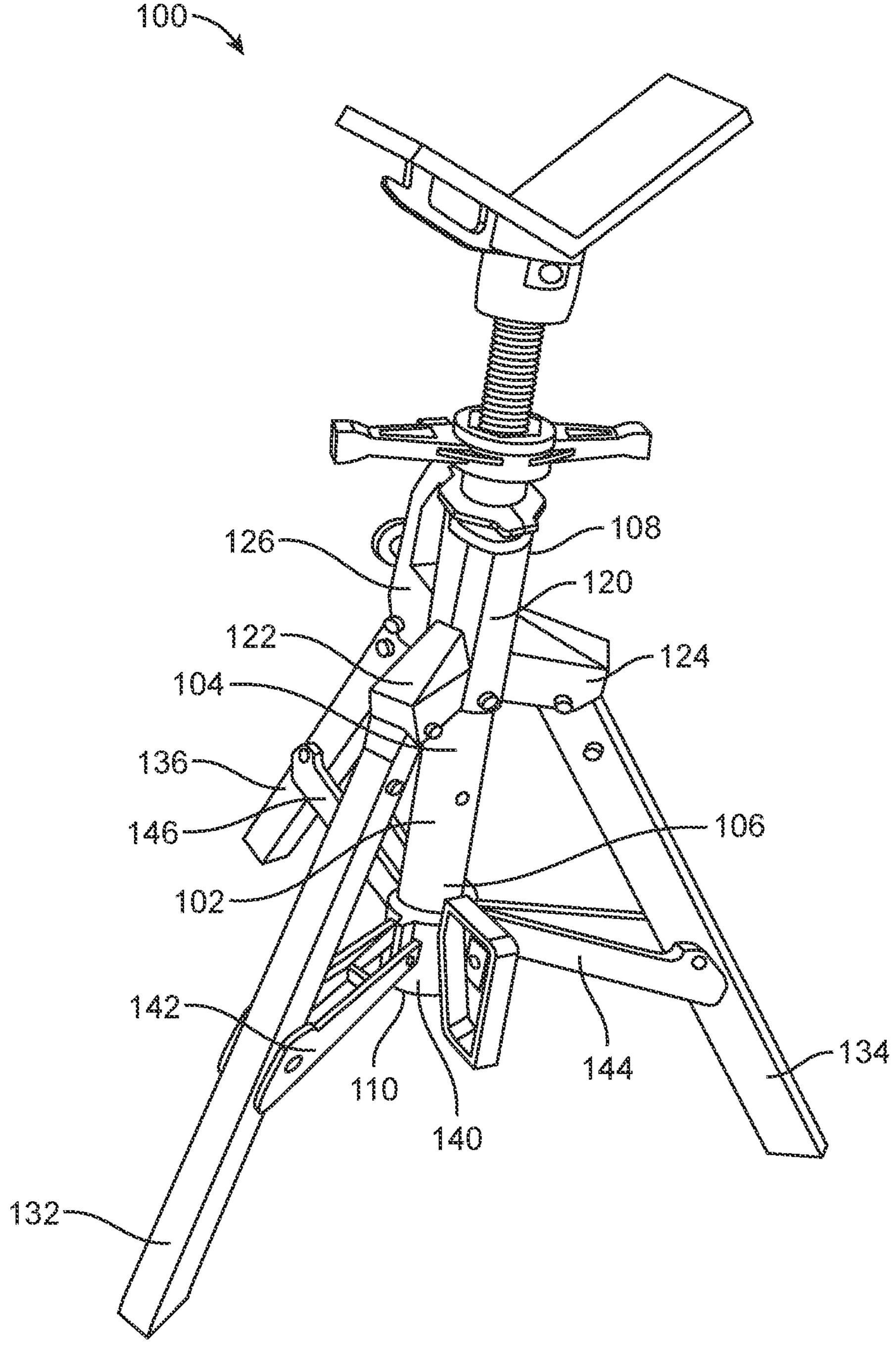
FIG. 2 is a second side perspective view of the pipe fitting stand of FIG. 1 in a deployed state.
Figure 3:
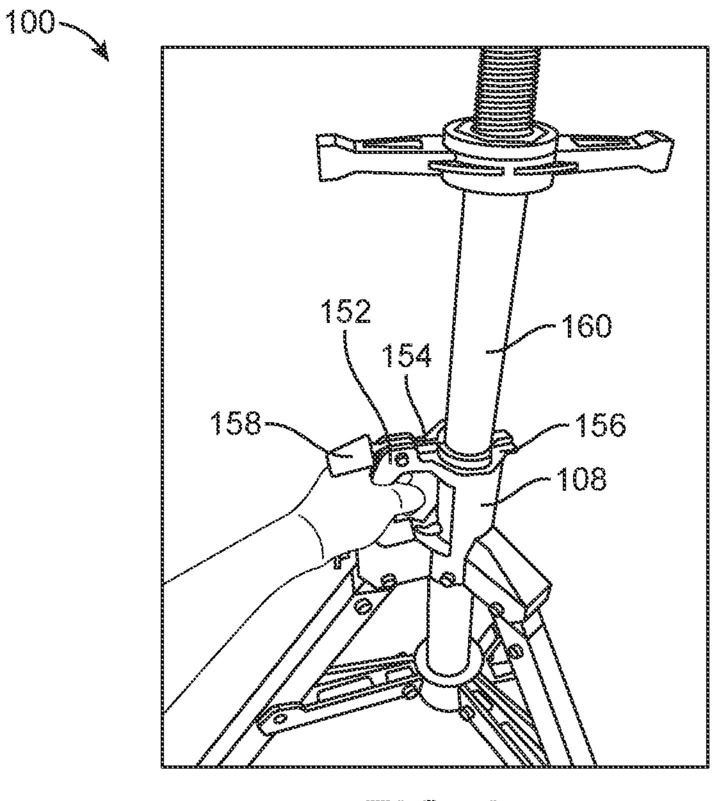
FIG. 3 is a first side perspective view of the locking mechanism and a jack handle of the pipe fitting stand of FIG. 1.
Figure 4:
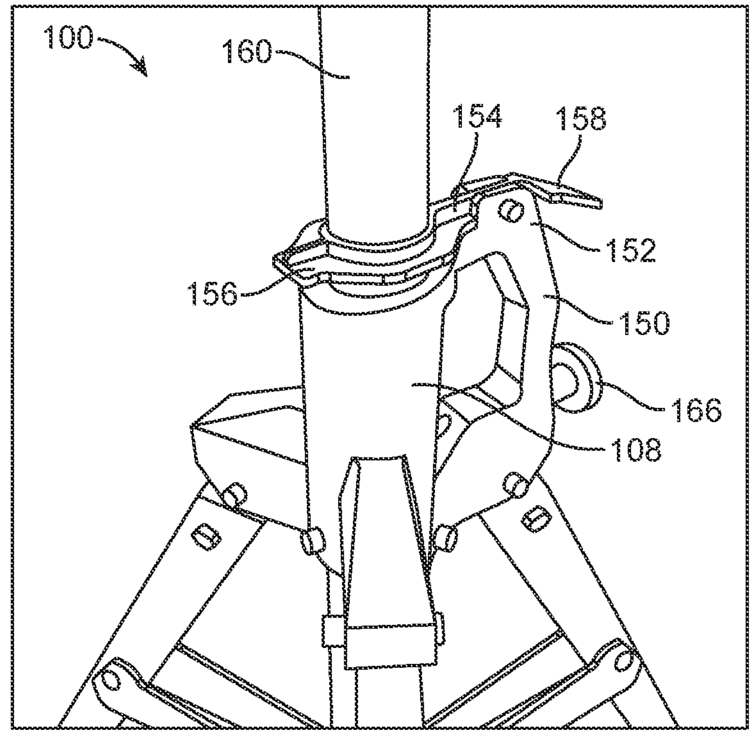
FIG. 4 is a first side perspective view of a locking mechanism of the pipe fitting stand of FIG. 1.

FIGS. 1 and 2 illustrate a pipe fitting stand 100 that includes a central support post 102 having an upper end 104 and a lower end 106. A fixed support structure 108 is disposed on the upper end 104 of the central support post 102. A sliding support structure 110 is disposed on the central support post 102 and may slide between the lower end 106 of the central support post 102 and the fixed support structure 108. The fixed support structure 108 includes a central fixed collar 120 and a first leg bracket 122, a second leg bracket 124, and a third leg bracket 126 extend radially outward from the central fixed collar 120. A first leg 132 is pivotably disposed in the first leg bracket 122. A second leg 134 is pivotably disposed in the second leg bracket 124. Further, a third leg 136 is pivotably mounted in the third leg bracket 126.

The sliding support structure 110 includes a central sliding collar 140. A first leg support 142 extends between the central sliding collar 140 and the first leg 132 and pivots thereon. A second leg support 144 extends between the central sliding collar 140 and the second leg 134 and pivots thereon. A third leg support 146 extends between the central sliding collar 140 and the third leg 136 and pivots thereon. As described in detail below, as the sliding support structure 110 moves in a first direction, (e.g., upward) along the central support post 102 toward the fixed support structure 108, the legs 132, 134, 136 are drawn inward by the leg supports 142, 144, 146 toward the central support post 102 from a deployed stated, as shown in FIGS. 1 and 2, to a folded state, shown in FIG. 14. Conversely, as the sliding support structure 110 moves in a second direction, (e.g., downward) along the central support post 102 away from the fixed support structure 108, the legs 132, 134, 136 are splayed outward by the leg supports 142, 144, 146 away from the central support post 102 to a deployed stated.

Referring now to FIGS. 3-6, the fixed support structure 108 includes a fixed upper handle 150 that may be used to carry the pipe fitting stand 100 or adjust a position of the pipe fitting stand 100 during use. The fixed upper handle 150 includes an upper mounting bracket 152 in which a height adjustment mechanism 154 is partially disposed and rotates therein. The height adjustment mechanism 154 includes a locking disc 156 and an actuating arm 158 extending therefrom. The pipe fitting stand 100 includes a telescoping post 160 that extends through the height adjustment mechanism 154 and into the central support post 102. The telescoping post 160 may be slidably disposed within the central support post 102. The height adjustment mechanism 154 pivots within the upper mounting bracket 152. Specifically, the height adjustment mechanism 154 may pivot in a downward direction to a locked position (i.e., toward a flat surface on which the pipe fitting stand 100 is placed) so that a central axis 157 of the locking disc 156 is misaligned with a central axis 161 of the telescoping post 160 to selectively engage the outer surface of the telescoping post 160 and exert friction on the outer surface of the telescoping post 160. This friction locks the telescoping post 160 relative to the central support post 102 to prevent the telescoping post 160 from further sliding into the central support post 102. The actuating arm 158 of the height adjustment mechanism 154 may be pivoted downward to a release position to align the central axis 157 of the locking disc 156 with the central axis 161 of the telescoping post 160 (i.e., the central axes are coaxial) and unlock the telescoping post 160 to allow it to slide further into the central support post 102.

Figure 5:
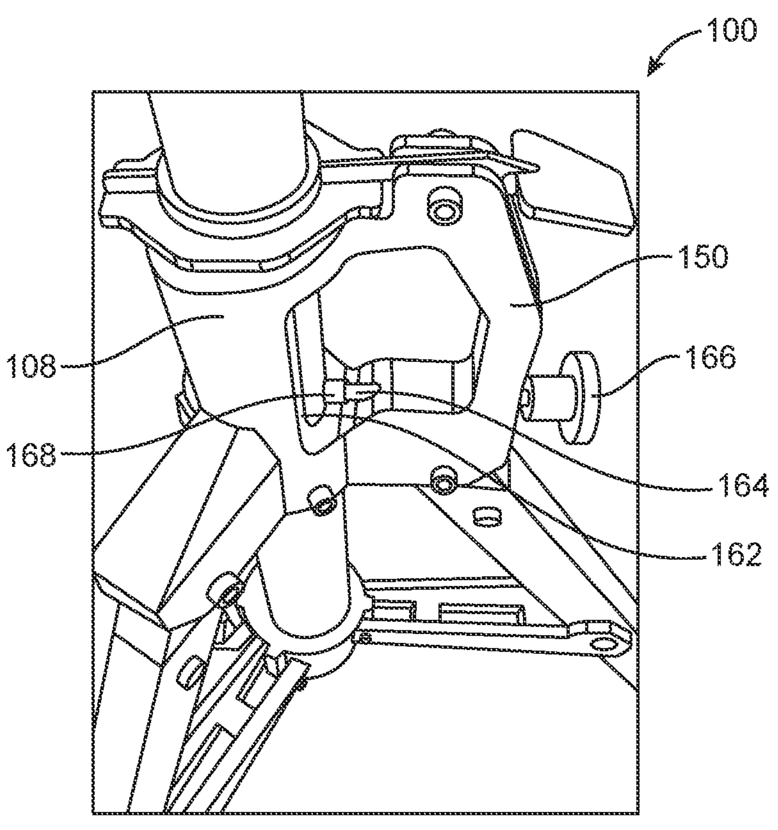
FIG. 5 is a second side perspective view of a locking mechanism of the pipe fitting stand of FIG. 1.
Figure 6:
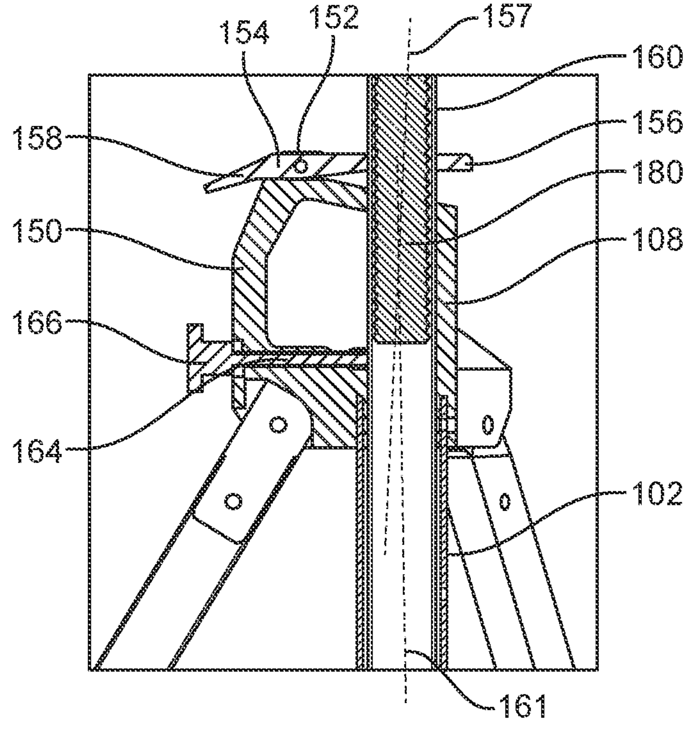
FIG. 6 is a cross section view of the locking mechanism of FIG. 6.

FIGS. 5 and 6 further indicate that the fixed support structure 108 includes an opening 162 adjacent the fixed upper handle 150. Moreover, a locking bolt 164 with a knob 166 extends through the fixed support structure 108 adjacent a base of the fixed upper handle 150 so that a distal end 168 of the locking bolt 164 engages a sidewall of the telescoping post 160 within the opening 162. The locking bolt 164 is threadably engaged with a bore in the fixed support structure 108 and as the locking bolt 164 is threaded into the fixed support structure 108, the distal end 168 of the locking bolt 164 may tighten against, and engage, the sidewall of the telescoping post 160 to prevent the telescoping post 160 from moving relative to the central support post 102. The opening 162 in the fixed support structure 108 allows a user to visually determine whether the distal end 168 of the locking bolt 164 is engaged with the telescoping post 160.

Figure 7:
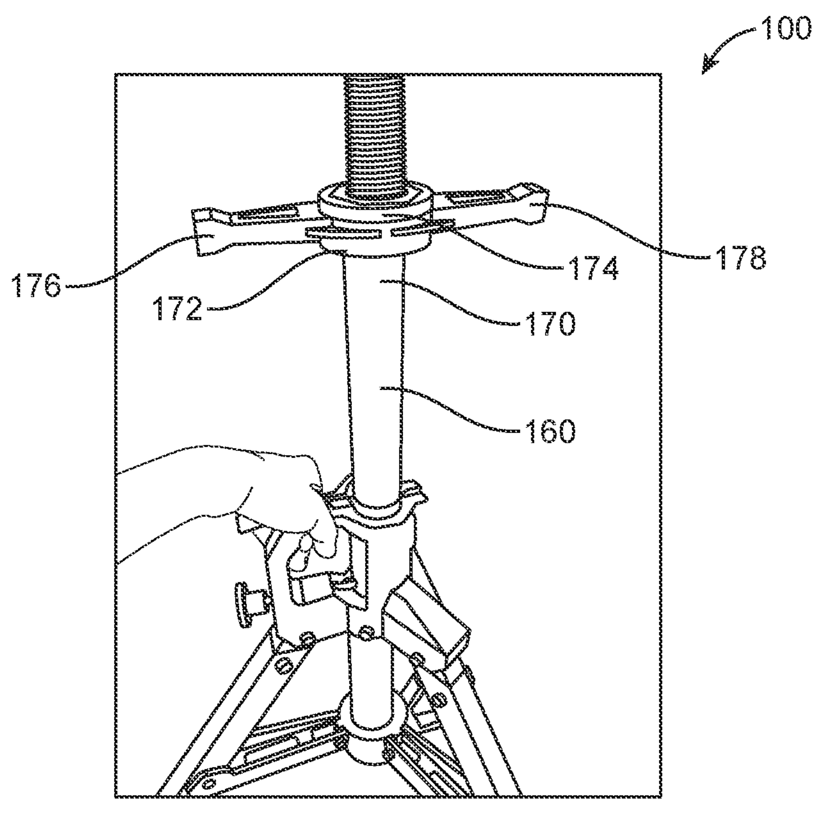
FIG. 7 is a second side perspective view of the locking mechanism and the jack handle of the pipe fitting stand of FIG. 1.
Figure 8:
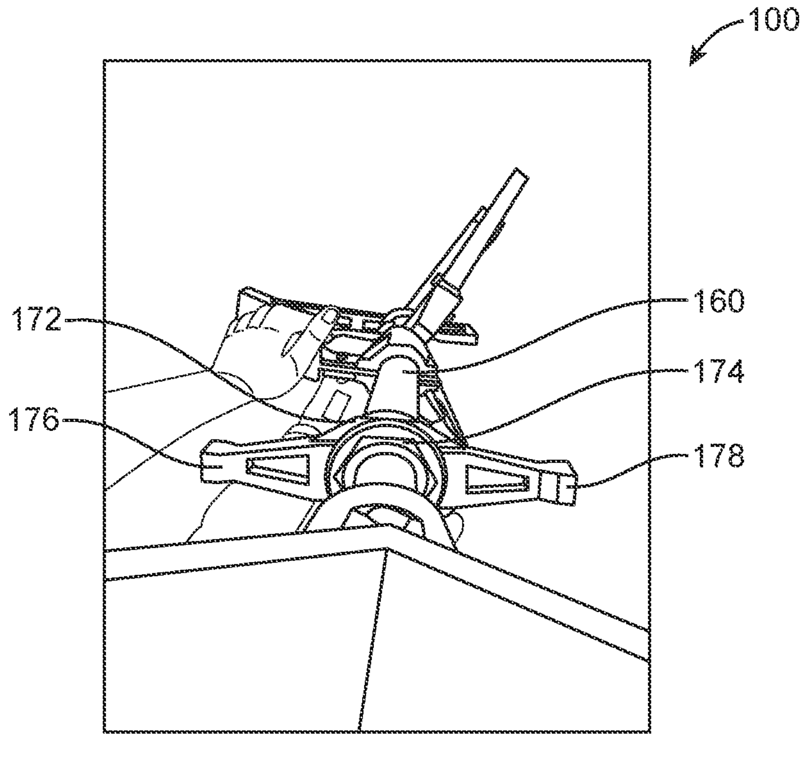
FIG. 8 is a first upper perspective view of the pipe fitting stand of FIG. 1.
Figure 9:
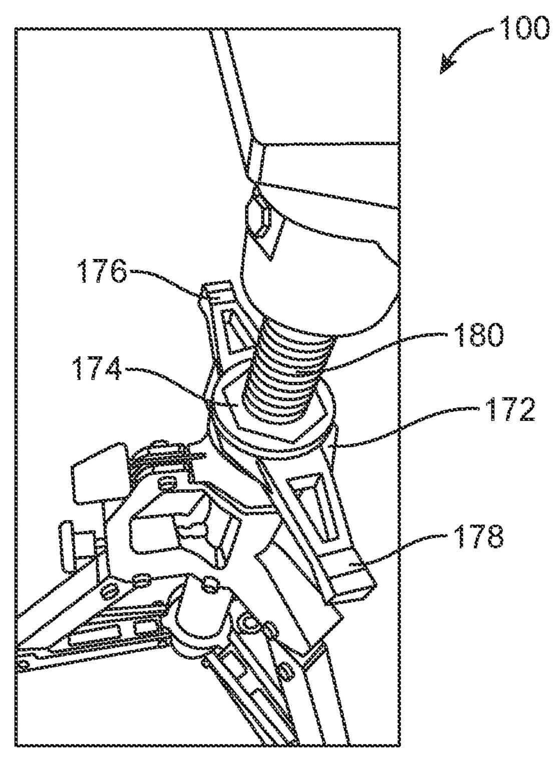
FIG. 9 is a second upper perspective view of the pipe fitting stand of FIG. 1.
Figure 10:
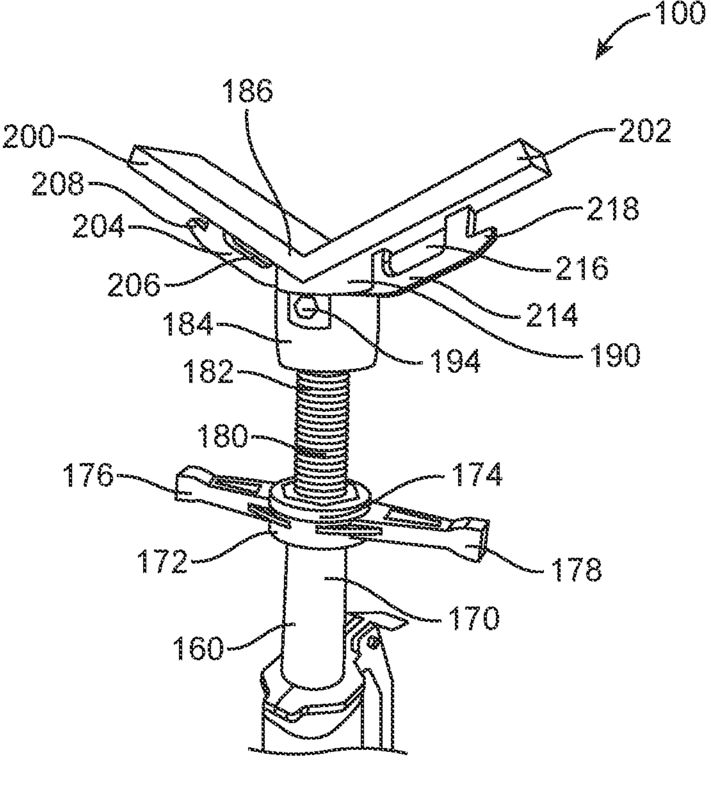
FIG. 10 is a first side perspective view of the upper portion of the pipe fitting stand of FIG. 1.

As illustrated in FIGS. 7-9, telescoping post 160 further includes an upper end 170 having a jack handle 172 rotatably disposed thereon. The jack handle 172 includes a central threaded collar 174 having a first handle 176 and a second handle 178 extending therefrom. It is to be understood that the central threaded collar 174 may be threaded or may have a threaded insert disposed therein. FIG. 10 indicates that an extension post 180 extends through the jack handle 172 and into the telescoping post 160. As shown, the extension post 180 may include external threads and therefore, may be threadably engaged with the central threaded collar 174 of the jack handle 172. Accordingly, when the jack handle 172 is rotated in a first direction, the extension post 180 retracts into the telescoping post 160 and when the jack handle 172 is rotated a second direction (opposite the first direction), the extension post 180 extends, or otherwise telescopes, out of the telescoping post 160.

Figure 11:
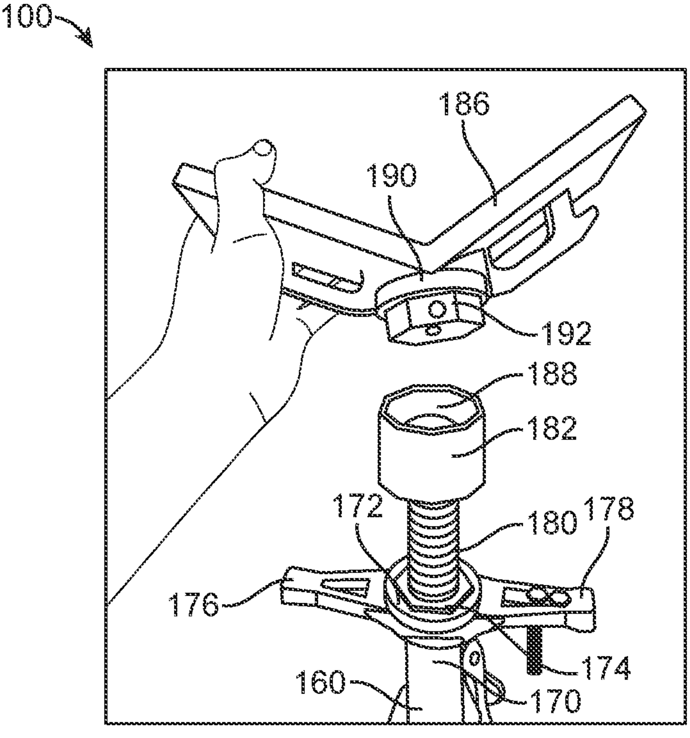
FIG. 11 is a second side perspective view of the upper portion of the pipe fitting stand of FIG. 1 with a cradle structure disengaged from a receiving collar.

FIGS. 10 and 11 further indicate that the extension post 180 includes an upper end 182 having a receiving collar 184 disposed thereon. A cradle 186 is removably engaged with the receiving collar 184. As shown, the cradle 186 may be a V-shaped pipe cradle. The receiving collar 184 includes a central opening 188. Further, the cradle 186 includes a base 190 from which a connector hub 192 extends (e.g., in a downward direction). The connector hub 192 is sized and shaped to fit into the central opening 188 of the receiving collar 184. Further, the connector hub 192 may be keyed to the central opening 188 of the receiving collar 184. A fastener 194, such as a pin or a bolt, may extend through a bore formed through the sidewall of the receiving collar 184 and through the connector hub 192 of the cradle 186 to engage the cradle 186 with the receiving collar 184 of the extension post 180. As such, the cradle 186 may be removed from the pipe fitting stand 100 and replaced with a different cradle 186 that is more suitable for a particular task or operation.

As further illustrated in FIGS. 10 and 11, the cradle 186 includes a first support plate 200 and a second support plate 202 extending from the base 190 to form a generally V-shape that may be used to cradle an end of a pipe. The first support plate 200 includes a first cleat 204 that extends in a generally downward direction from a bottom of the first support plate 200. The first cleat 204 includes an enclosed eye 206 and a cantilevered horn 208 extending therefrom. The second support plate 202 includes a second cleat 214 that extends in a generally downward direction from a bottom of the second support plate 202. The second cleat 214 includes an enclosed eye 216 and a cantilevered horn 218 extending therefrom. During use of the pipe fitting stand 100, the cleats 204, 214 enable a user to secure a pipe, or similar structure, with a chain, a strap, a rope, etc., to maintain a position of the pipe while performing an operation on the pipe, like welding a fitting or other pipe thereto.

Figure 12:
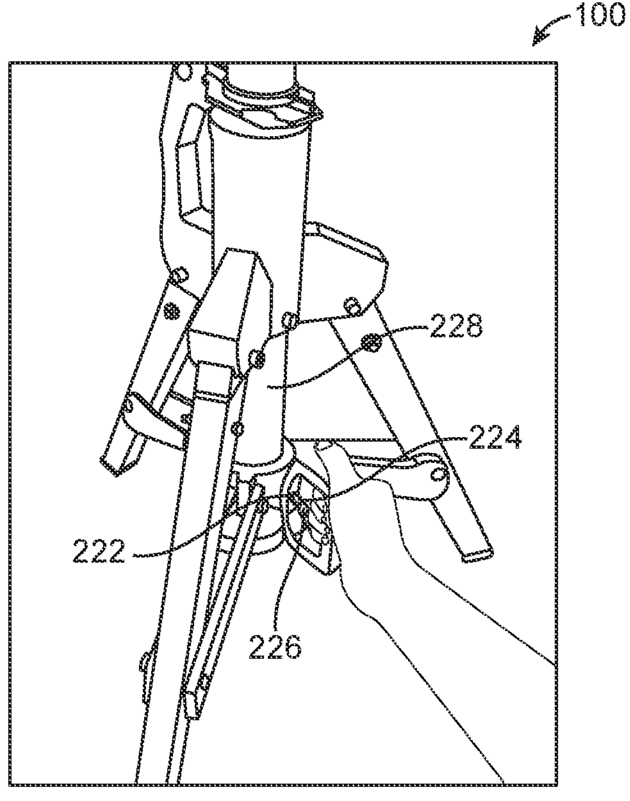
FIG. 12 is a perspective view of a folding leg assembly of the pipe fitting stand of FIG. 1.
Figure 13:
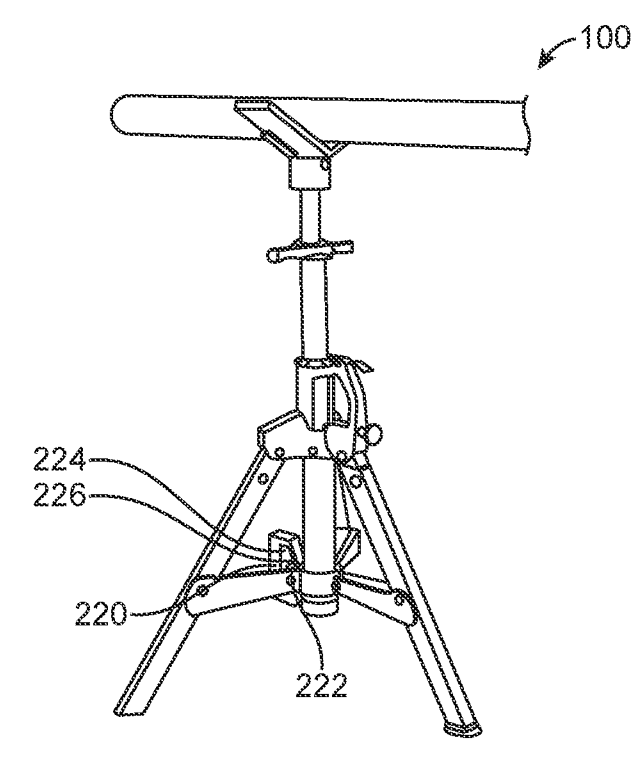
FIG. 13 is a side perspective view of the pipe fitting stand of FIG. 1 supporting and end of a pipe while in a deployed state.
Figure 14:
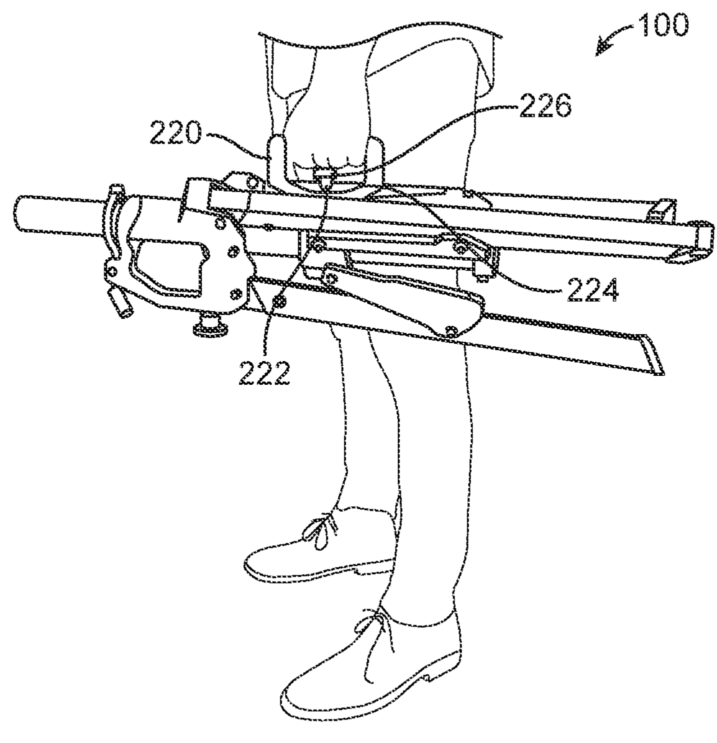
FIG. 14 is a side perspective view of the pipe fitting stand of FIG. 1 in a folded state.
Figure 15:
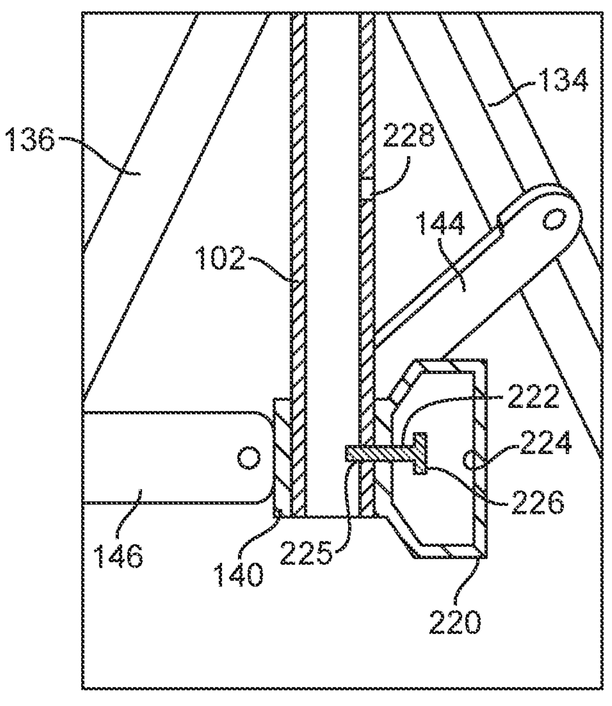
FIG. 15 is a cross section of a lower handle of the pipe fitting stand of FIG. 1.

FIGS. 12-15 show that the sliding support structure 110 of the pipe fitting stand 100 includes a sliding lower handle 220. As the sliding lower handle 220 is moved along the central support post 102 toward the fixed upper handle 150, the legs 132, 134, 136 are drawn inward to a folded state and as the sliding lower handle 220 is moved away from the fixed upper handle 150, the legs 132, 134, 136 splay outward to a deployed state As shown, the sliding lower handle 220 includes a spring-loaded plunger 222 extending from a handle opening 224 within the sliding lower handle 220 through a sidewall of the central sliding collar 140 and into a lower hole 225 formed in the central support post 102. This locks the sliding support structure 110 and the legs 132, 134, 136 in a deployed state as shown in FIGS. 12, 13, and 15. The spring-loaded plunger 222 includes a knob 226 that may be pulled into the handle opening 224 to retract an end of the spring-loaded plunger 222 from the lower hole 225. Then, the sliding support structure 110 may be slide upward along the central support post 102 until the end of the spring-loaded plunger 222 is aligned with an upper hole 228 formed in the central support post 102. The knob 226 can be released to allow the end of the spring-loaded plunger 222 to engage the upper hole 228 this locks the sliding support structure 110 and the legs 132, 134, 136 in the folded state. As shown in FIG. 14, in the folded state, the legs 132, 134, 136 are drawn toward the central support post 102 so that the pipe fitting stand 100 has a relatively small footprint to facilitate storage and transport. In the folded state, the lower handle 220 may be used to carry the pipe fitting stand 100 as shown in FIG. 14.

Figure 16:
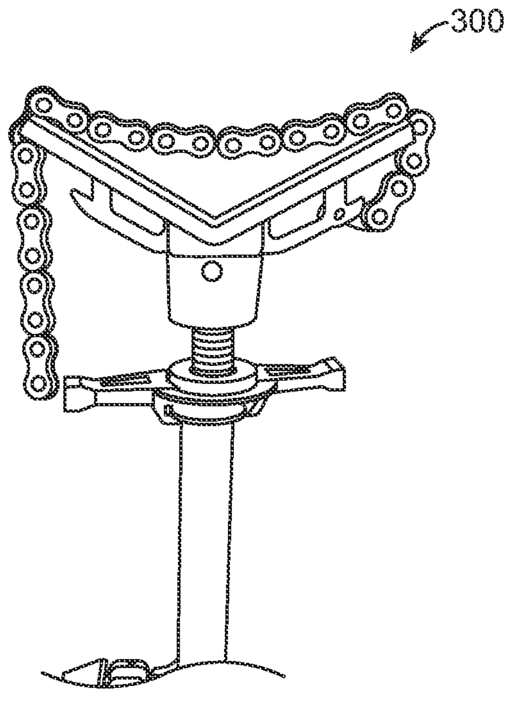
FIG. 16 is a side perspective view of another cradle structure for a pipe fitting stand according to an embodiment of the disclosure.

FIG. 16 shows another cradle 300 that may be engaged with the pipe fitting stand 100. As shown, the cradle 300 includes a chain vise. In other embodiments, the cradle 300 may be made from different materials, the cradle 300 may have different sizes, the cradle 300 may have different shapes, the cradle 300 may include one or more rollers (made of job specific materials), or the cradle 300 may include additional features not listed herein.

Accordingly, the pipe fitting stand 100 allows different cradles (or V-heads) to be swapped for more job specific cradles. The cleats on the cradle enable a user to secure pipes or other structures to the cradle to allow for single user operation. The height adjustment mechanism is safer than traditional height adjusters. Also, the user can visually determine that the locking bolt is properly engaged. The upper and lower handles allow the pipe fitting stand 100 to be easily moved and carried, whether in the deployed state or the folded state. The legs may be quickly and relatively easily moved between the folded stated and the deployed stated.

Although the invention has been described in detail with reference to certain preferred embodiments, variations and modifications exist within the scope and spirit of one or more independent aspects of the invention as described.

What is claimed is:

1. A pipe fitting stand comprising:

a central support post;

a fixed support structure disposed on the central support post;

a sliding support structure disposed on the central support post;

a telescoping post extending at least partially into the central support post;

a cradle engaged with the telescoping post that is configured to support a portion of a pipe;

at least three legs extending from the fixed support structure; and a leg support pivotably coupled to each of the at least three legs and the sliding support structure, wherein as the sliding support structure is moved along the central support post in a first direction, the at least three legs are drawn inward to a folded state, and wherein as the sliding support structure is moved in a second direction, the at least three legs splay outward to a deployed state.

2. The pipe fitting stand of claim 1, wherein the central support post includes an upper end and a lower end, and wherein the fixed support structure is disposed on the upper end of the central support post.

3. The pipe fitting stand of claim 2, wherein the sliding support structure slides between the lower end of the central support post and the fixed support structure.

4. The pipe fitting stand of claim 1, wherein the telescoping post is slidably disposed within the central support post.

5. The pipe fitting stand of claim 1, further comprising an extension post extending partially into the telescoping post, wherein the cradle is disposed on the extension post.

6. The pipe fitting stand of claim 5, wherein the extension post includes an upper end having a receiving collar disposed on the upper end and the cradle is removably engaged with the receiving collar.

7. The pipe fitting stand of claim 6, wherein the receiving collar includes a central opening and the cradle includes a connector hub sized and shaped to fit into the central opening of the receiving collar.

8. A pipe fitting stand comprising:

a central support post;

a fixed support structure disposed on the central support post, the fixed support structure including a fixed upper handle;

a sliding support structure slidably disposed on the central support post, the sliding support structure including a sliding lower handle;

a telescoping post slidably disposed within the central support post;

a cradle engaged with the telescoping post that is configured to support a portion of a pipe;

at least three legs extending from the fixed support structure; and a leg support extending between each of the at least three legs and the sliding support structure, wherein as the sliding lower handle is moved along the central support post toward the fixed upper handle, the at least three legs are drawn inward to a folded state, and wherein as the sliding lower handle is moved away from the fixed upper handle, the at least three legs splay outward to a deployed state.

9. The pipe fitting stand of claim 8, wherein the upper handle includes a height adjustment mechanism, wherein the telescoping post extends through the height adjustment mechanism, and wherein the height adjustment mechanism selectively engages the outer surface of the telescoping post to prevent the telescoping post from sliding into the central support post.

10. The pipe fitting stand of claim 9, wherein the height adjustment mechanism includes a locking disc having a central opening and an actuating arm opposite the locking disc, and wherein the telescoping post extends through the central opening of the locking disc.

11. The pipe fitting stand of claim 10, wherein the locking disc pivots to a locked position when a central axis of the locking disc is misaligned with a central axis of the telescoping post, and wherein the locking disc exerts friction on the telescoping post when in the locked position to prevent the telescoping post from sliding into the central support post.

12. The pipe fitting stand of claim 10, further comprising a locking bolt that extends through the fixed support structure adjacent the upper handle, wherein the locking bolt selectively engages the telescoping post to prevent the telescoping post from moving relative to the central support post.

13. A pipe fitting stand comprising:

a central support post having an upper end and a lower end;

a fixed support structure disposed on the upper end of the central support post;

a sliding support structure disposed on the central support post, wherein the sliding support structure slides between the lower end of the central support post and the fixed support structure;

a telescoping post extending at least partially into the central support post, the telescoping post slidably disposed within the central support post and including an upper end;

an extension post extending at least partially into the telescoping post;

a cradle disposed on the extension post that is configured to support a portion of a pipe;

at least three legs extending from the fixed support structure; and a leg support extending between each of the at least three legs and the sliding support structure, wherein as the sliding support structure moves along the central support post toward the fixed support structure, the at least three legs are drawn inward to a folded state, and wherein as the sliding support structure is moved away from the fixed support structure, the at least three legs splay outward to a deployed state.

14. The pipe fitting stand of claim 13, further comprising a jack handle rotatably disposed on the upper end of the telescoping post, wherein the extension post extends through the jack handle.

15. The pipe fitting stand of claim 14, wherein the jack handle includes a central threaded collar and at least one handle extends from the central threaded collar, wherein the extension post is formed with external threads, and wherein the extension post is threadably engaged with the central threaded collar.

16. The pipe fitting stand of claim 15, wherein in response to the jack handle being rotated in a first direction, the extension post retracts into the telescoping post, and wherein in response to the jack handle being rotated in a second direction, the extension post extends from the telescoping post.

17. The pipe fitting stand of claim 13, wherein the sliding support structure includes a central sliding collar, and wherein each leg support pivots on the central sliding collar as the central sliding collar moves along the central support post.

18. The pipe fitting stand of claim 17, wherein the sliding support structure further includes a lower handle affixed to the central sliding collar, and wherein the lower handle moves with the central sliding collar as the central sliding collar is moved along the central support post.

19. The pipe fitting stand of claim 18, wherein the lower handle includes a spring-loaded plunger that extends from a handle opening within the lower handle through a sidewall of the central sliding collar and into a lower hole formed into the central support post or an upper hole formed in the central support post.

20. The pipe fitting stand of claim 19, wherein the spring-loaded plunger extends into the lower hole to lock the legs in the deployed state, and wherein the spring-loaded plunger extends into the upper hole to lock the legs in the folded state.

* * * * *